US008745434B2

(12) United States Patent
Yang et al.

(10) Patent No.: US 8,745,434 B2
(45) Date of Patent: Jun. 3, 2014

(54) PLATFORM FOR CONTINUOUS MOBILE-CLOUD SERVICES

(75) Inventors: Fan Yang, Beijing (CN); Zhengping Qian, Beijing (CN); Xiuwei Chen, Beijing (CN); Ivan Beschastnikh, Seattle, WA (US); Li Zhuang, Mountain View, CA (US); Lidong Zhou, Beijing (CN); Guobin Shen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 13/108,690

(22) Filed: May 16, 2011

(65) Prior Publication Data

US 2012/0297249 A1  Nov. 22, 2012

(51) Int. Cl.
*G06F 11/00* (2006.01)

(52) U.S. Cl.
USPC ............................................. 714/4.1; 709/226

(58) Field of Classification Search
CPC .............. G06F 3/0608; G06F 12/0253; G06F 12/0269; G06F 12/0276
USPC ................. 714/4.1, 15, 20; 709/231, 226
See application file for complete search history.

(56) References Cited

U.S. PATENT DOCUMENTS

| 7,392,319 | B2 * | 6/2008 | Liu et al. ........................ | 709/231 |
| 7,590,739 | B2 * | 9/2009 | Swildens et al. ............... | 709/226 |
| 2002/0161890 | A1 * | 10/2002 | Chen .............................. | 709/226 |
| 2003/0154284 | A1 * | 8/2003 | Bernardin et al. ............. | 709/226 |
| 2008/0270838 | A1 | 10/2008 | Dorai et al. | |
| 2009/0224941 | A1 | 9/2009 | Kansal et al. | |
| 2010/0248698 | A1 | 9/2010 | In et al. | |
| 2010/0293532 | A1 | 11/2010 | Andrade et al. | |
| 2011/0161980 | A1 * | 6/2011 | English et al. ................. | 718/105 |
| 2011/0276695 | A1 * | 11/2011 | Maldaner ....................... | 709/226 |
| 2012/0166645 | A1 * | 6/2012 | Boldyrev et al. ............. | 709/226 |

OTHER PUBLICATIONS

Babcock et al, "Models and Issues in Data Stream Systems", Proceedings of the 21st ACM SIGMOD-SIGACT-SIGART symposium on Principles of database systems, Jun. 2002, 30 pgs.

Balan et al, "Simplifying Cyber Foraging for Mobile Devices", Jun. 2007, Proceedings of the 5th international conference on Mobile systems, applications and services, pp. 272-285.

Balan et al, "Tactics Based Remote Execution for Mobile Computing", May 2003, Proceedings of the 1st international conference on Mobile systems, applications and services, 14 pgs.

(Continued)

*Primary Examiner* — Scott Baderman
*Assistant Examiner* — Joseph Kudirka
(74) *Attorney, Agent, or Firm* — Carole Boelitz; Micky Minhas; Lee & Hayes, PLLC

(57) ABSTRACT

Data that is collected and disseminated by mobile devices typically has to be processed, correlated with other data, aggregated, and then transmitted back to the mobile device users before the information becomes stale or otherwise irrelevant. These operations may be performed in a cloud-based solution that manages dataflow. The cloud-based solutions may be scalable and implemented in a fault-tolerant distributed system to support user-facing continuous sensing and processing services in the cloud-computing system. A system may monitor execution of data and shift workloads (i.e., balancing) in response to spatial and temporal load imbalances that occur in a continuous computing environment. A failure recovery protocol may be implemented that uses a checkpoint-based partial rollback recovery mechanism with selective re-execution, which may allow recovery of the continuous processing after an error while avoiding large amounts of downtime and re-execution.

20 Claims, 8 Drawing Sheets

(56) References Cited

OTHER PUBLICATIONS

Balazinska et al, "Fault Tolerance in the Borealis Distributed Stream Processing System", Jun. 2005, ACM SIGMOD Conf., 43 pgs.
Burke et al, "Participatory Sensing", Oct. 2006, Workshop on World-Sensor-Web (WSW06): Mobile Device Centric Sensor Networks and Applications, 5 pgs.
Carney et al, "Monitoring Streams—A New Class of Data Management Applications", Proc 28th VLDB Conf, Jan. 2002, 12 pgs.
Chaiken et al, "SCOPE: Easy and Efficient Parallel Processing of Massive Data Sets", Aug. 2008, Proceedings of the VLDB Endowment, vol. 1, Issue 2, 12 pgs.
Chandrasekaran et al, "TelegraphCQ: Continuous Dataflow Processing for an Uncertain World", Jan. 2003, Proc of 2003 CIDR conf, 12 pgs.
Chandy et al, "Distributed Snapshots: Determining Global States of Distributed Systems", Feb. 1985, ACM Transactions on Computer Systems, vol. 3, No. 1, pp. 63-75.
Chang et al, "Bigtable: A Distributed Storage System for Structured Data", Nov. 2006, Seventh Symposium on Operating System Design and Implementation, 14 pgs.
Condie et al, "MapReduce Online", Apr. 2010, Proceedings of the 7th USENIX conference on Networked systems design and implementation, 15 pgs.
Cuervo et al, "MAUI: Making Smartphones Last Longer with Code Offload", Jun. 2010, ACM MobiSys 2010, 14 pgs.
Davies et al, "Limbo: A Tuple Space based Platform for Adaptive Mobile Applications", May 1997, Joint International Conference on Open Distributed Processing and Distributed Platforms (ICODP/ICDP97), 12 pgs.
Dean et al, "MapReduce: Simplified Data Processing on Large Clusters", Dec. 2004, Sixth Symposium on Operating System Design and Implementation OSDI04, 13 pgs.
Deng et al, "Fault Tolerant and Reliable Computation in Cloud Computing", National Tsing Hua University White Paper, Aug. 2010, 5 pgs.
Flinn et al, "Balancing Performance, Energy, and Quality in Pervasive Computing", Nov. 2002, Proc 22nd Intl Conf on Distributed Computer Systems (ICDCS02), 10 pgs.
"Foursquare", retrieved on Jan. 6, 2011 at http://foursquare.com, 2010, 1 pgs.
Ghemawat et al, "The Google File System", Oct. 2003, 19th ACM Symposium on Operating Systems Principles, 15 pgs.
Gray et al, "Leases: An Efficient Fault Tolerant Mechanism for Distributed File Cache Consistency", Dec. 1989, SOSP89 Proceedings of the twelfth ACM symposium on Operating systems principles, p. 202-210.
Isard et al, "Dryad: Distributed Data Parallel Programs from Sequential Building Blocks", Mar. 2007, Proceedings of the 2007 Eurosys Conference, 14 pgs.
Kistler et al, "Disconnected Operation in the Coda File System", Feb. 1992, ACM Transactions on Computer Systems, vol. 10, No. 1, 13 pgs.
Kwon et al, "Fault Tolerant Stream Processing Using a Distributed, Replicated File System", Aug. 2008, Proceedings of the VLDB Endowment, vol. 1, Issue 1, 12 pgs.
Lin et al, "PacificA: Replication in Log Based Distributed Storage Systems", Feb. 2008, Microsoft TechReport, MSR-TR-2008-25, 14 pgs.
Logothetic et al, "Stateful Bulk Processing for Incremental Analytics", Jun. 2010, ACM Symposium on Cloud Computing (SOCC10), 12 pgs.
MacCormick et al, "Boxwood: Abstractions as the Foundation for Storage Infrastructure", Dec. 2004, Symposium on Operating System Design and Implementation (OSDI), 16 pgs.
Madden et al, "The Design of an Acquisitional Query Processor for Sensor Networks", Jun. 2003, Proceedings of the 2003 ACM SIGMOD international conference on Management of data, 12 pgs.
Marinelli, "Hyrax: Cloud Computing on Mobile Devices Using MapReduce", Master Thesis, Carneigie Mellon Univ Pittsburgh PA School of Computer Science, Sep. 2009, 123 pgs.
Meckenstock et al, "Rolling Back in a Selective Way—An Approach to Recovery for Interactive and Long Running Transactions", May 1996, 2nd Intl Baltic Workshop on DB and IS, Tallinn, Estonia, 12 pgs.
Mun et al, "PEIR, the Personal Environmental Impact Report, as a Platform for Participatory Sensing Systems Research", Jun. 2009, Proceedings of the 7th international conference on Mobile systems, applications, and services, 14 pgs.
Murphy et al, "Lime: A Coordination Model and Middleware Supporting Mobility of Hosts and Agents", Jul. 2006, ACM Transactions on Software Engineering and Methodology (TOSEM), vol. 15, Issue 3, 49 pgs.
Olston et al, "Pig Latin: A Not So Foreign Language for Data Processing", Jun. 2008, Proceedings of the 2008 ACM SIGMOD international conference on Management of data, 12 pgs.
Samimi et al, "Mobile Service Clouds: A Self Managing Infrastructure for Autonomic Mobile Computing Services", Jun. 2006, Proceedings of the Second IEEE International Workshop on Self-Managed Networks, Systems and Services (SelfMan), vol. 3996, pp. 130-141.
Sellis, "Multiple Query Optimization", Mar. 1988, ACM Transactions on Database Systems, vol. 13, No. 1, pp. 23-52.
Shah et el, "Highly Available, Fault Tolerant, Parallel Dataflows", Jun. 2004, Proceedings of the 2004 ACM SIGMOD international conference on Management of data, 12 pgs.
"Twitter" retrieved Jan. 4, 2011 at http://www.mahalo.com/twitter, 5 pgs.
Welsh et al, "SEDA: An Architecture for Well Conditioned, Scalable Internet Services", Oct. 2001, Proceedings of the eighteenth ACM symposium on Operating systems principles, 14 pgs.
Wikipedia, "Google Latitude", retrieved Jan. 4, 2011 from http://en.wikipedia.org/wiki/Google Latitude, 3 pgs.
Yahoo, "Pipes" retrieved Jan. 4, 2011 at http://pipes.yahoo.com/pipes/, 1 pg.
Yahoo, "YQL Guide", Query Language, retrieved Jan. 6, 2011 from http://developer.yahoo.com/yql/guide/, 1 pg.
Yu et al, "DryadLINQ: A System for General Purpose Distributed Data Parallel Computing Using a High Level Language", Dec. 2008, Eighth Symposium on Operating System Design and Implementation, 14 pgs.
Zheng et al, "Mining Interesting Locations and Travel Sequences from GPS Trajectories", Apr. 2009, WWW 2009 Proceedings of the 18th international conference on World wide web, 10 pgs.
Zheng et al, "Understanding Mobility Based on GPS Data", Sep. 2008, UbiComp 08 Proceedings of the 10th international conference on Ubiquitous computing, 10 pgs.
Zhou et al, "Efficient Exploitation of Similar Subexpressions for Query Processing", Jun. 2007, Proceedings of the 2007 ACM SIGMOD international conference on Management of data, 12 pgs.

* cited by examiner

600 ⤵

```
1   var trace = new Stream<Location>;
2   trace.Subscribe(TripSegmentation);
3   trace.Append(GPS.Query());
4
5   var gps = new ActiveStream<Location>
6     (GPS.Query, TimeSpan.FromSeconds(30));
7   //...define processing logic based on the GPS stream
8   gps.Activate();
9
10  Stream<Location> X;
11  var Y = X.Where(l =>
12    l.Precision < MAX_ERROR_ALLOWED)
13    .Select(MatchLocationOnMap);
14
15  Stream<double> X;
16  var Y = X.HoppingWindow(TimeSpan.FromSeconds(5)) .Average();
17
18  Stream<double> X; // temperatures
19  var peakTemperature = State<double>
20    .Aggregate(X, (oldPeak, x) => (x > oldPeak ? x : oldPeak));
21
22  Stream<Waypoint> X;
23  X.Partitionable<int>(pt => pt.USER_ID).Subscribe(Func);
24
25  SyncStream<double> X;
26  SyncSinkStream<double> Y = X.GetSink();
27  Y.Subscribe(...);
28  X.Append(...);
29
30  SyncStream<double> X;
31  X.Batch(MAX_ELEMENT_COUNT, TIMEOUT).Zip();
```

```
1   // Built   in timer stream: ActiveStream<bool>
2   var signals = new
      TimerStream(TimeSpan.FromSeconds(30));
3   // Lower sampling rate when in low battery mode
4   int n = 0;
5   signals = signals
6   .Select(_ => {
7     n++;
8     return (LOW_BATTERY ? (n % N) == 0 : true);
9   })
10  .Where(b => b);
11  // Filter out samples taken indoors
12  signals = signals.Where(!Context.IsIndoor);
13  var gps = signals.Select(_ => GPS.Query());
```

PLATFORM FOR CONTINUOUS MOBILE-CLOUD SERVICES

BACKGROUND

Use of web-enabled mobile communication devices, such as smartphones and tablets, has steadily increased in recent years. Many such mobile devices are capable of quickly collecting and disseminating large amounts of context-sensitive information to benefit a user of the device or other users.

Often, people use applications on mobile devices that leverage various sensors, such as global positioning system (GPS) sensors typically included in the mobile devices, along with user-generated data, such as text messages and videos. Many people access these applications or similar sources of continuously updated information. For example, Twitter®, Facebook®, and Foursquare® all provide updated user information, which may then be processed and posted online or to other users (e.g., subscribers) in a relatively short amount of time.

As an example, the mobile device may determine a user's location via GPS and then disseminate the location information, possibly with a message from the user or with other data, to update a location of the user and provide a review or commentary on a location (e.g., a restaurant review). Such disseminated information may be of interest and/or beneficial to other people who may "follow" the user.

Typically, this information is processed by servers, correlated with other data, aggregated, and then transmitted back to users before the information becomes stale or otherwise irrelevant. For example, when a user posts a message to announce her location to friends, the location information may be irrelevant if it is not received by the user's friends before the user leaves her current location.

It is also important that back-end support and processing of these mobile-based communications are fast, reliable, and implemented in cost effective ways. The back-end support may be implemented by leveraging cloud-based solutions to process and manage dataflow, which may decentralize the information processing.

SUMMARY

Cloud-based solutions may manage and process a data stream provided by mobile devices. Cloud-based solutions may be scalable and can be implemented as a fault-tolerant distributed system to support user-facing continuous sensing and processing services. Such a system can monitor execution of data and shift workloads (i.e., reallocation, balancing, etc.) in response to spatial and temporal load imbalances that may occur in a continuous computing environment. A failure recovery protocol may be implemented that uses a checkpoint-based partial rollback recovery mechanism with selective re-execution, which may allow recovery of the continuous processing after an error while avoiding large amounts of downtime and re-execution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 is an illustrative algorithm to perform basic stream operations to process continuous mobile data.

FIG. 7 is an illustrative algorithm to perform adaptive sampling rate control for the mobile devices.

DETAILED DESCRIPTION

Overview

Figure 1:
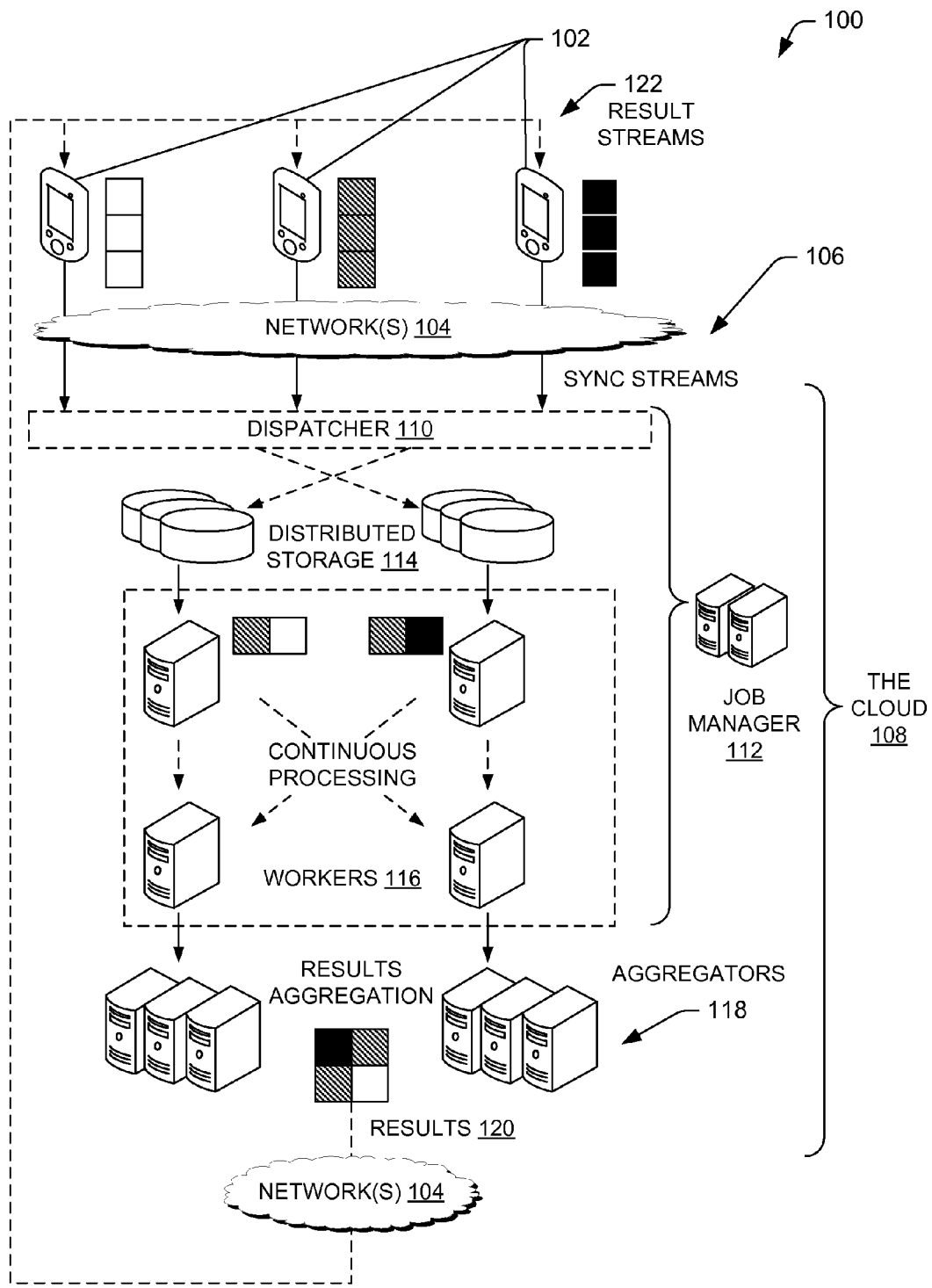
FIG. 1 is a schematic diagram of an illustrative environment to enable continuous processing of data to and from mobile devices using a cloud-computing system.

As discussed above, data that is collected and disseminated by mobile devices typically has to be processed, correlated with other data, aggregated, and then transmitted back to mobile devices before the information becomes stale or otherwise irrelevant. The processing operations may be performed using cloud-computing systems/solutions to process and manage dataflow.

The processing operations may be implemented as a continuous data processing system in contrast to batch processed systems used in prior solutions. Because data from the mobile devices arrives substantially continuously and unpredictably (especially when the number of users is on the order of millions), runtime monitoring and adaptation to the dynamics of incoming data is important and thus conducive to continuous processing.

The cloud-based solutions may be scalable and implemented in a fault-tolerant distributed system to support user-facing continuous sensing and processing services in the cloud-computing system. The cloud processing may be scaled to enable processing of large amounts of incoming data while remaining responsive to produce results in a timely manner as more data continues to arrive. For example, the system may monitor execution of data and shift workloads (i.e., perform load-balancing) in response to spatial and temporal load imbalances that occur in a continuous computing environment.

In addition, a failure recovery protocol may be implemented to perform checkpoint-based partial rollback recovery with selective re-execution, which may allow recovery of the continuous processing after an error while avoiding large amounts of downtime and re-execution. Data from continuously operating services accumulates over time, thus the failure recovery strategy of re-computation, as used in batch processes, does not work well in continuous data processing. This is because restarting an entire computation, if possible, would likely result in stale data and result in a large computation overhead.

In some instances, the techniques discussed herein may organize the continuously generated data in the form of a stream and provide SQL-like interfaces to operate over the stream. Computing may be driven or triggered by recurring stream updates and data operations that subscribe to stream updates. The techniques may incorporate more traditional interfaces from stream databases, including stream scoping (windowing) and stream composition. Stream partitioning may also be supported for parallel in-cloud computation.

Sync streams may be used to reduce burdens on programmers related to the network environment and provide common optimizations for mobile-cloud communications, such as data batching, compression, and filtering. By using sync streams, programmers may move computation modules between the mobile and cloud platforms with greater ease. Programmers use the same set of interfaces mentioned above to operate over the stream both on mobile and in-cloud, which simplifies the development of the system.

The processes and systems described herein may be implemented in a number of ways. Example implementations are provided below with reference to the following figures.

Illustrative Environment

FIG. 1 is a schematic diagram of an illustrative environment 100 to enable continuous processing of data to and from mobile devices using a cloud-computing system. The environment includes mobile devices 102 that may periodically or continuously disseminate data for use by other devices, such as location information, messages, videos, or other types of data. The mobile devices 102 may include any type of device capable of transmitting data across a network 104, such as a mobile communications network (e.g., 3G, 4G), a computing network (e.g., Wi-Fi, WiMax, etc.), and so forth. For example, the mobile device 102 may be a mobile telephone, a laptop computer, a set top box, a gaming console, a media player, or other types of computing devices.

The mobile devices 102 may collect and transmit data along sync streams 106, which may be information generated by the user, generated by the mobile device via sensors, or a combination of both. For example, activities of a user of a mobile device may be inferred from a user's activity via context and semantics (e.g., user is walking, user is at location x, etc.). The sync streams 106 are then used to stream data from the mobile devices to a cloud-computing system ("the cloud") 108 for aggregation and further processing as described below.

In the cloud 108, streaming data from multiple mobile devices 102 is dispatched by a dispatcher 110 under the control of a job manager 112 to one or more distributed storage locations 114 for at least temporary storage of the streams of data. The job manager 112 then allocates work to the workers 116 which process the streams of data. The workers 116 may correlate the streams of data with other data, which may be stored in the cloud 108, such as in the distributed storage 114. For example, the workers 116 may correlate data from different mobile devices or data from a mobile device to other data to generate an inference about the data. The job manager 112 may reallocate work to the workers 116 during the continuous processing by the workers 116 of the streams of data. In this way, the cloud 108, using the job manager 112, may enable processing of the data in a scalable, fault-tolerant, and efficient manner. More specifically, the job manager 112 may be able to react to spikes and lows in incoming data from the mobile devices 102 by adjusting the amount of time data is stored in the distributed storage 114, reassigning work among the various workers 116, adding new workers, or by using other techniques discussed herein.

In some embodiments, aggregators 118 may aggregate processed information from the workers 116 to create results 120. The results 120 are then delivered back to individual mobile devices 102 via the network(s) 104 as new sync streams. These result streams 122 can be considered as sensor streams on the mobile devices 102 and may trigger further processing. Alternatively, the result stream values may be displayed to users via their mobile applications (e.g., display a friend's current location, etc.).

Illustrative Architecture

Figure 2:
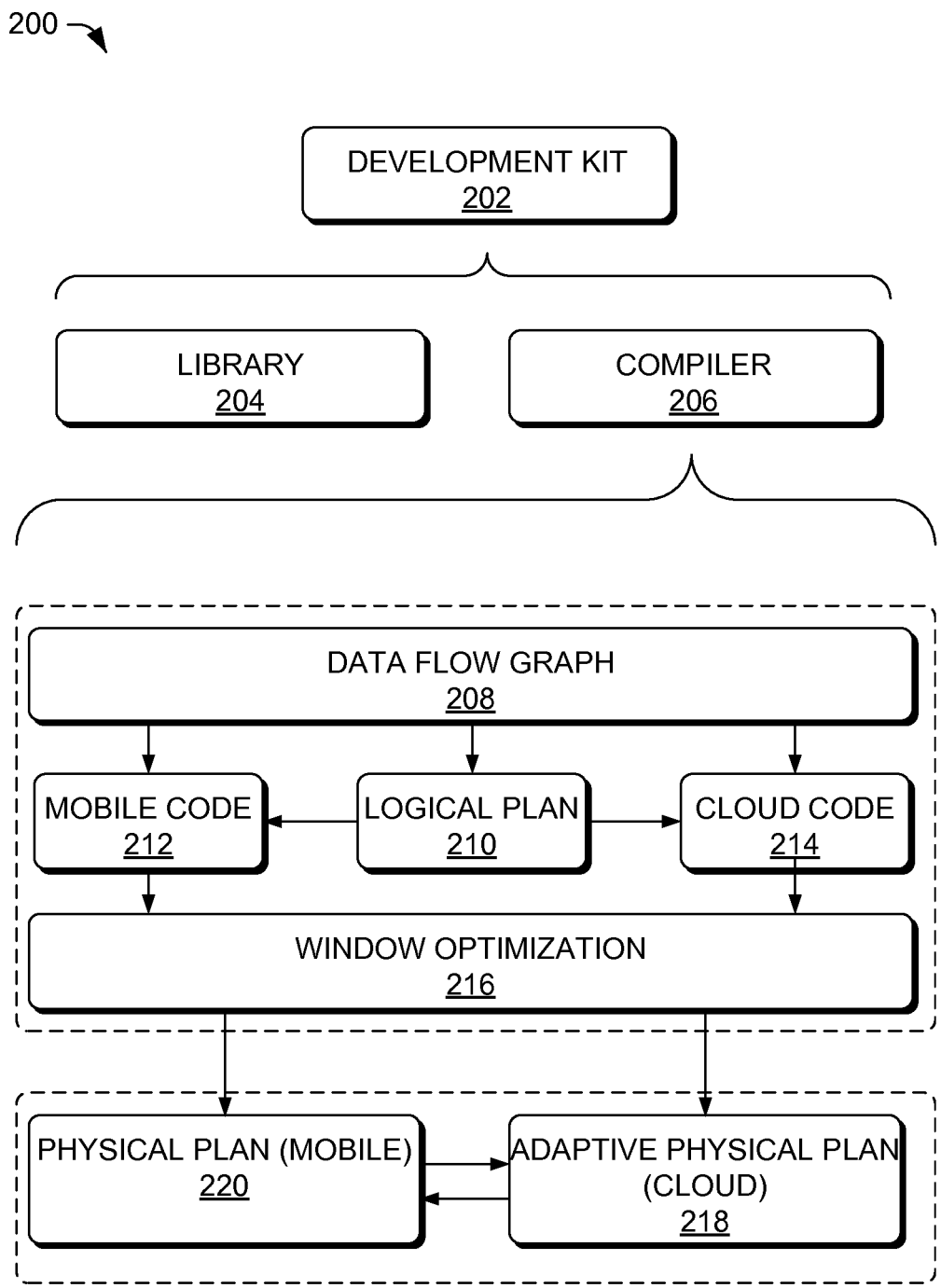
FIG. 2 is a block diagram of an illustrative architecture to process mobile streaming data.

FIG. 2 is a block diagram of an illustrative architecture 200 to process mobile streaming data. The architecture includes a programming development kit 202 for the platforms of the mobile devices 102 and the cloud 108. The programming development kit 202 may include a library 204 with the stream interface and stream support utilities and a compiler 206 which may compile original user code into two parts, one for execution on the mobile device and another for execution in the cloud.

In accordance with various embodiments, the compiler 206 may compile a program into a data flow graph 208. Each vertex in the data flow graph 208 may be a stream operator. A stream operator receives data from input streams and outputs its computation results into output streams.

The data flow graph 208 may be compiled into a logical plan 210, which combines some consecutive operators together into executable vertices. Executable vertices may be connected with streams, which represent data flow in the architecture during execution. Each execution vertex may be a stand-alone executable unit that can be assigned for execution on one of the workers 116 shown in FIG. 1. The logical plan 210 may also define the execution boundary between the platforms of the mobile devices 102 and the cloud 108. In some embodiments, developers may explicitly define the execution boundary. The logical plan 210 may be provided as mobile code 212 or cloud code 214 as shown in the architecture 200.

In various embodiments, when generating the logical plan 210, the compiler 206 may apply two window-based operation optimizations ("window optimization") 216. First, instead of performing an operation on individual windows that contain a subset of data elements in the stream, the compiler 206 may at times calculate a result of the next window based on the prior one. This is possible when the windows overlap and incremental computation of an operation is possible. Incremental window operations may be implemented for common aggregations such as mean, variance, and Discrete Fast Fourier Transformation (DFFT). Second, when multiple operators exist, redundant computation may occur. The compiler 206 may choose to eliminate the redundant computation and have the results shared across multiple stream operators.

The logical plan 210 may contain the cloud code 214. The cloud code 214 is a subgraph of the logical plan 210 assigned to the cloud that is shipped to a cloud runtime as a cloud adaptive physical plan 218. This cloud runtime schedules and assigns computation resources (e.g., the workers 116), resulting in the cloud adaptive physical plan 218. This plan contains information like the number of executable vertex instances and machine (worker) assignments for each vertex. Each logical vertex is therefore mapped to a set of physical vertices. As the incoming stream rate and machine availability change the cloud's adaptive physical plan 218 is dynamically adapted to meet processing needs with the available resources.

The mobile code 212 may be assigned to the mobile devices 102 and used in a mobile physical plan 220. The mobile devices 102 may run the executable code as a client program.

In some embodiments, the cloud code 214 that is shipped to the cloud 108 may include a serialized subgraph of the logical plan 210 and a set of binary libraries (e.g. DLLs) of user code. The cloud runtime may start the job manager 112 (shown in FIG. 1) with the subgraph and binary libraries as inputs. The job manager 112 may be responsible for translating the logical plan 210 into the cloud adaptive physical plan 218, and for assigning physical vertices to workers 116. The job manager 112 also starts the dispatcher 110 to perform the dispatcher service where all stream data from mobile devices 102 is first received and then distributed to a set of corresponding workers 116.

The job manager 112 may monitor the execution of the cloud code 214 to adjust the physical vertex assignment in response to changes in the system, including load changes (balancing) and in response to failures.

In various embodiments, use of the stream abstraction enables the leveraging of prior work on stream processing engines for processing tasks that have relaxed latency requirements. This allows the system to trade off latency to gain fault tolerance with less overhead, and better throughput and scalability. Computation and processing may be performed using continuous incremental computation over long time-windows (e.g., a day, etc.). The absence of real-time constraints allows the usage of large streams in distributed storage to optimize incremental computation.

The techniques described herein may be used to maintain a single stream entry, the last N entries, or all entries in the last M seconds of a stream of data depending on the interface used to construct the stream. In some embodiments, entries in a sliding window (of time) might be laid out as a ring buffer. When an entry is accessed by a subscriber based on a key other than the timestamp, it may be more beneficial to store the entries in a data structure such as a hash table. This in-memory stream processing design may be optimized for low latency and may be shared across mobile and cloud platforms.

Illustrative Checkpointing Mechanism

The cloud runtime provides reliable and scalable storage services for storing large amounts of streamed data. This includes incoming data streams and/or output streams as results of a computation, as well as checkpointing data. The distributed storage 114 is designed as a scalable storage system that can partition stream entries across a set of machines (e.g., the workers 116) and dynamically scale up to involve more machines by re-partitioning the stream as it grows. Each machine storing a partition maintains (1) a "base" portion of the partition on local persistent storage, (2) a series of delta portions on local persistent storage representing updates to the base portion, and (3) an in-memory portion containing the most recent updates to the partition. A centralized partition manager maintains the partition map. For data reliability, each partition is replicated using a replication protocol, with the partition manager maintaining the replica set for each partition. The partition manager itself may also be replicated. The partition manager may be co-located with the job manager 112 or be implemented as a separate manager.

Vertices that generate data as input to vertex V in the physical plan are termed input vertices of V. Vertices that receive output from vertex V are termed output vertices of V. Downstream vertices of a vertex V are vertices whose input is derived from V's output, which includes V's output vertices, their output vertices, and so on, as a transitive closure.

As discussed above, computation is designed to be fault tolerant and thus able to recover from faults with little or no disruption to the supported services. Failure recovery via re-computation from prior stages (such as used in batch processing models) is not appropriate for two reasons: (1) restarting a long-running execution from the beginning imposes an unacceptable latency, and (2) streaming data introduces computation non-determinism, complicating replay. As an example, one may consider a simple reduce-like phase, where a computation vertex accepts incoming data from multiple vertices in the previous stage. Interleaving of data from source vertices is one source of non-determinism. A typical map/reduce computation avoids this problem because a reduce is performed on all data across all source vertices. Some computations may be insensitive to the order of incoming data. However, even in these instances, the state of a vertex may depend on how much source vertex data was received and processed.

In various embodiments, the system checkpoints computation periodically and adopts a combination of partial rollback recovery and map/reduce style re-computation from previous stages to strike a balance between run-time overhead and recovery cost. In some instances, the system may use developer-assisted checkpointing to extract and store an application state.

In some embodiments, incoming data from mobile devices 102 is first logged in a reliable data store using the distributed storage 114. As incoming data is no longer needed when its corresponding end results have been reliably recorded, the incoming data logs are eventually removed via a garbage collection process.

The checkpointing may start when a central controller (e.g., the job manager 112) dispatches checkpoint markers to the incoming source vertices. Each vertex V uses an array received for tracking input vertices from which the markers have not arrived. The vertex V records messages as part of the checkpoint from these input vertices until the markers arrive. The state of a checkpoint on each vertex transitions from INPROGRESS, to COMPLETED, and then to STABLE. When the state is STABLE on vertex V, that same checkpoint may be STABLE on all its input vertices. When a checkpoint is STABLE on all vertices in the last stage, it is STABLE on all vertices. This condition may be used for the garbage collection process. In some embodiments, checkpointing on vertices is performed in accordance to the flow diagram shown in FIG. 3, which is described next.

Figure 3:
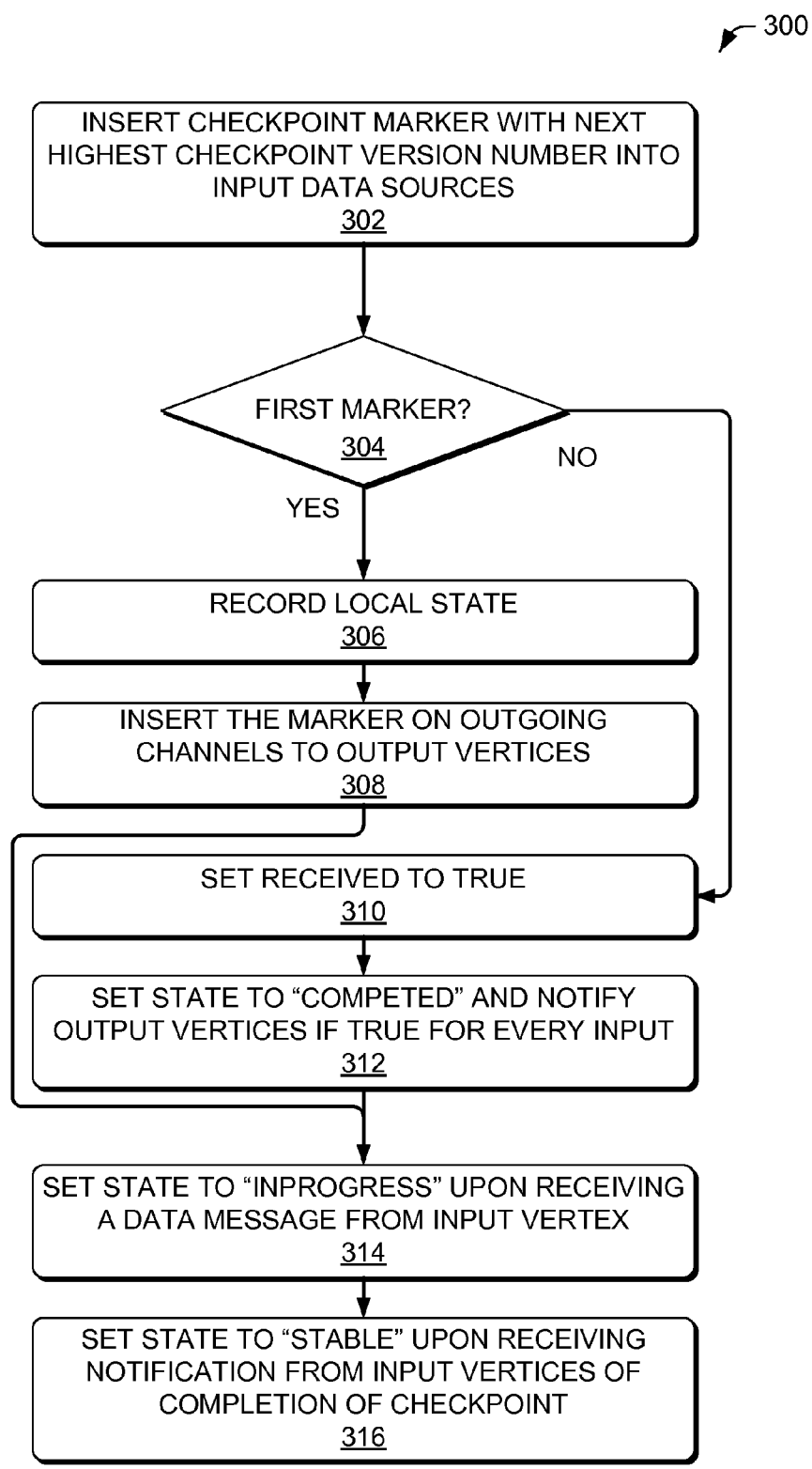
FIG. 3 is a flow diagram of an illustrative process to manage checkpointing.

FIG. 3 is a flow diagram of an illustrative process 300 to manage checkpointing.

At 302, a central controller may insert checkpoint markers with the next highest checkpoint version number c into all input data sources to initiate a new checkpoint c.

At 304, upon receiving a marker c from input vertex I, a processing vertex V may check whether this is the first marker c it has received. If so, the processing vertex may proceed to execute 306.

At 306, vertex V records its local state as part of the checkpoint. At 308, the vertex V inserts the marker c on its outgoing channels to all output vertices. Vertex V may initialize array received[c][N] to false for every input vertex N. Vertex V may further set array State[c] to INPROGRESS.

When the marker is not the first marker at 304, processing may continue at 310. At 310, vertex V sets received[c][I] to true. At 312, if received[c][N] is true for every input vertex N of V, vertex V sets State[v] to COMPLETED and notifies all its output vertices of the completion of checkpoint c on vertex V.

At 314, upon receiving a data message m from input vertex I, if State[c]=INPROGRESS and received[c][I]=false holds, then vertex V records (I;m) in the checkpoint.

At 316, upon receiving notifications from all its input vertices of the completion of checkpoint c on those vertices, the vertex V sets State[c] to STABLE.

The checkpoint data may be stored in the distributed storage 114 and replicated for reliability. In some embodiments, checkpointing is not on the critical path of computation and normal computation does not have to wait for checkpointing to complete before proceeding.

As in map/reduce, a vertex records its output locally. This allows for re-execution when any of its output vertices fail. If such output is lost, the system can fall back to an earlier stage for re-execution and in the worst case re-read the reliably stored mobile input to the computation.

Due to the relaxed latency constraints, the system may only replicate the checkpoints and the initial mobile input data. As a result, for the same number of machines, the system may have a higher system throughput and similar latency during executions with no failures.

Illustrative Rollback Recovery

Figure 4:
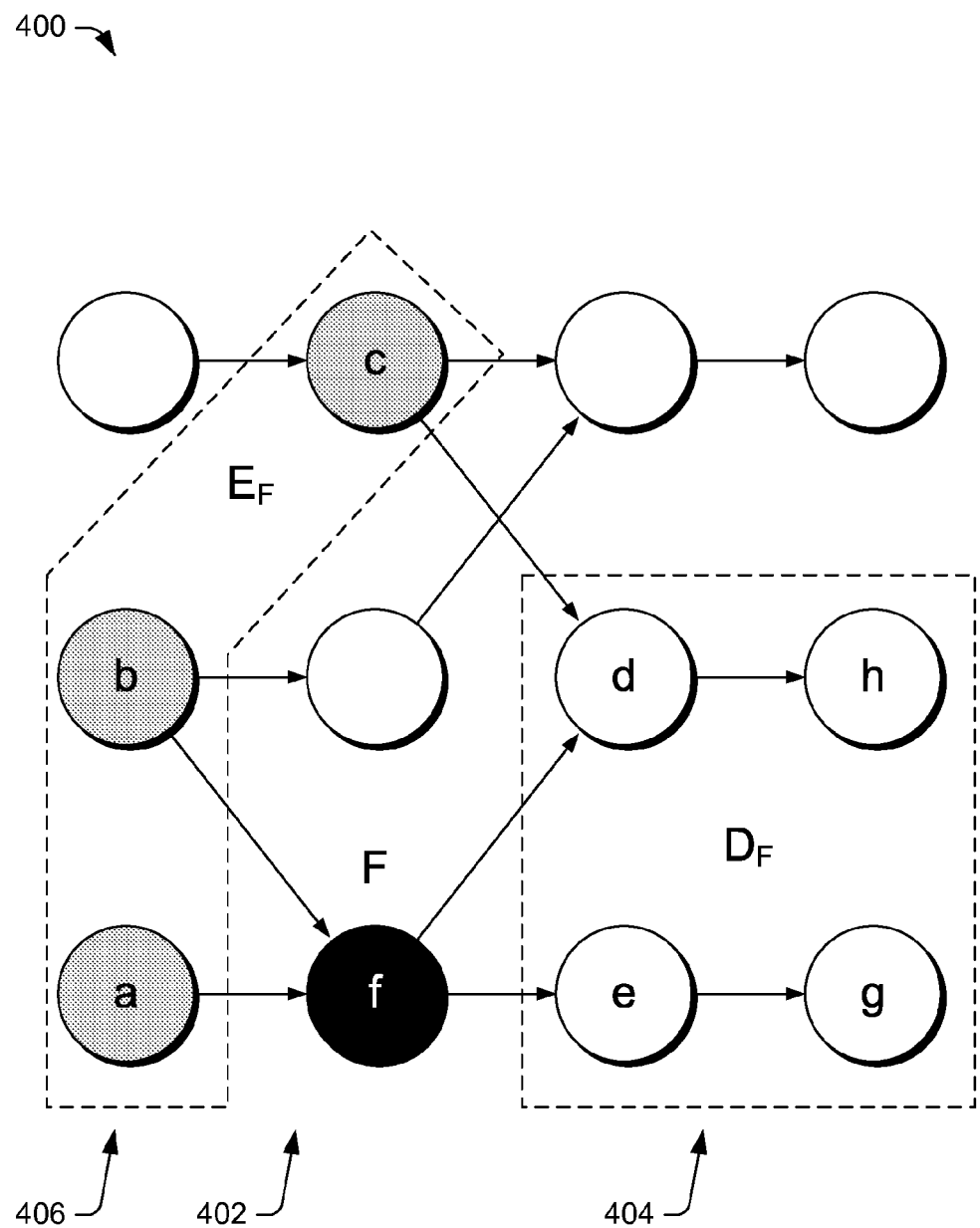
FIG. 4 is a graph of illustrative vertices that are used to illustrate an example rollback recover after a failure.

FIG. 4 is a graph of illustrative vertices 400 that are used to illustrate an example rollback recover after a failure. Recover from failures may be performed by rolling back to a latest checkpoint and then continue processing from the checkpoint forward. To avoid unnecessary rollbacks, a recovery mechanism may use a partial rollback mechanism. A fault at a vertex V affects only V's downstream vertices. Therefore, only V and V's downstream vertices need to be rolled back for another computation. After rolling back to a latest stable checkpoint, the recovery of V can be performed with re-execution, as in map/reduce, since inputs to V's computation are available in the local storage of V's input vertices, as discussed above.

In some embodiments, "F" 402 may be a set of vertices that have failed and "$D_E$" 404 may be the set of downstream vertices from any vertex in F. A rollback set $R_F$ is the union of F and $D_F$, as shown in equation 1.

$$R_F = F \cup D_F \quad \text{Equation (1)}$$

These vertices may be rolled back to the latest consistent checkpoint. A re-execution set $E_F$ 406 may contain all input vertices of $R_F$ that are not in $R_F$. To restart vertices in $R_F$ from the checkpoint, vertices in $E_F$ may replay inputs. If the recorded output for re-execution is lost on a vertex V in $E_F$, vertex V may be added to the rollback set and the re-execution may start from an earlier stage. In some instances, all vertices may be in the rollback set and the entire computation may restart from that latest consistent checkpoint. Proper execution of the recovery follows directly from global consistency that is provided by the global checkpointing protocol.

FIG. 4 shows an example of failure recovery. Each circle represents a vertex, with directed edges (represented by connecting lines) indicating the direction of data flow. In this example, vertex f is the only failed vertex: F={f}. Vertices d, e, g, and h are the downstream vertices of f: $D_F$={d; e; g; h}. All vertices in $R_F$={d; e; f; g; h} may be rolled back to the latest consistent checkpoint. The shaded vertices in $E_F$={a; b; c} may again provide the outputs for vertices that are rolling back.

In some embodiments, all downstream vertices are rolled back, along with vertices that actually fail due to non-determinism. When rolled back, re-execution on a vertex could deviate from the previous run due to non-determinism in the computation (e.g., the order in which it processes data from different input channels). Therefore, the downstream vertices which depend on outputs from the re-executions are rolled back. If the computation is known to be deterministic in certain stages, rolling back can be avoided on some vertices.

To address non-determinism, parallel stream database systems usually serialize and replicate incoming data from multiple input vertices for future deterministic replay. This may improve the recovery speed but imposes a serialization and replication burden on the system in the critical execution path of the normal case.

When a checkpoint of version "c" becomes stable at an end of a computation, data necessary to reproduce c can be removed via a garbage collection process. This may include logged incoming data up to the checkpoint marker for c, lower-version checkpoints, and the output recorded for execution at intermediate stages up to the checkpoint. In practice, to guard against catastrophic failures it may be prudent to maintain multiple checkpoints in case the latest one is lost or damaged. This is especially the case when there is ample cloud storage.

The job manager 112 may be responsible for monitoring the execution of a job and maintaining the mapping from the logical plan 210 to a physical deployment, while remaining fault tolerant. To remain fault tolerant, the job manager 112 may write its state to reliable storage. Because the state of the job manager 112 is updated infrequently, this is not on the critical path of job execution and the performance impact is minor. A central master (which itself could be replicated using state machine replication) can monitor the health of job managers and assign a new machine to take over when a job manager fails. A new job manager would then load the state from reliable storage and assume the new role. Leases from the central master can be used to ensure that there is only one active job manager for each job.

Illustrative Dynamic Load Adaptation

As discussed above, the system supports applications where data arrives continuously and computation is triggered as new data becomes available. Such continuous computation may create two types of imbalances. The first type is spatial imbalance where a certain portion of the system may become overloaded. Spatial balance is non-trivial to maintain for continuous computation as characteristics of incoming data may change over time. The second type of imbalance is temporal imbalance, which may manifest as load fluctuation because of sudden surges in load. As discussed next, load re-balancing and flow control are employed to mitigate spatial and temporal imbalances.

The job manager 112 may be in charge of dynamically mapping the logical plan 210 into a physical plan. The job manager 112 may monitor the load on spare machines and those involved in the computation. When a machine in a certain stage is overloaded, the job manager 112 may recruit a spare machine (e.g., another one of the workers 116 or a new worker) to take over some of the load (e.g., 50%). Similarly, if the load on a certain machine diminishes, load re balancing merges load across some of the workers 116.

Continuous mobile-cloud services aggregate collected sensor data across users (e.g., location). In some embodiments, hash partitioning may be used on user IDs and a dynamic hash function may be used for adaptation. The job manager 112 may monitor processor utilization on each of the workers 116 to make load balancing decisions. A worker may be considered overloaded when its processor utilization exceeds a maximum threshold (e.g., 80%, 90%, 95% in the implementation). When this occurs, the job manager 112 may split the hash range assigned to the overloaded machine and re-assigns half (or another amount) of the range to a spare machine. Hash ranges can also be merged when the workers 116 are under-utilized, and thus fail to exceed a minimum threshold (e.g. under 10%, 20%, 30%, etc.). Because the amount of state kept in each processing stage is small for some services, the overhead of such hash merging and splitting may be relatively small. Merging and splitting can also be done with other partitioning mechanisms with varying bookkeeping overheads.

When the incoming data rate suddenly exceeds the processing capacity, flow control may be used to cope with the load. This may involve a temporarily trade off of latency for throughput and scalability. Rather than sending data along a processing pipeline, the flow control detects an overload and redirects data for temporary storage. This data is processed once the system catches up with the load. Redirection takes advantage of periods of low load for catching up, and enables batching for higher throughput. When the incoming data rate exceeds the throughput of the storage system, the cloud 108 may push back onto the mobile devices to adaptively reduce the sensor sampling frequency.

Illustrative Operation

Figure 5:
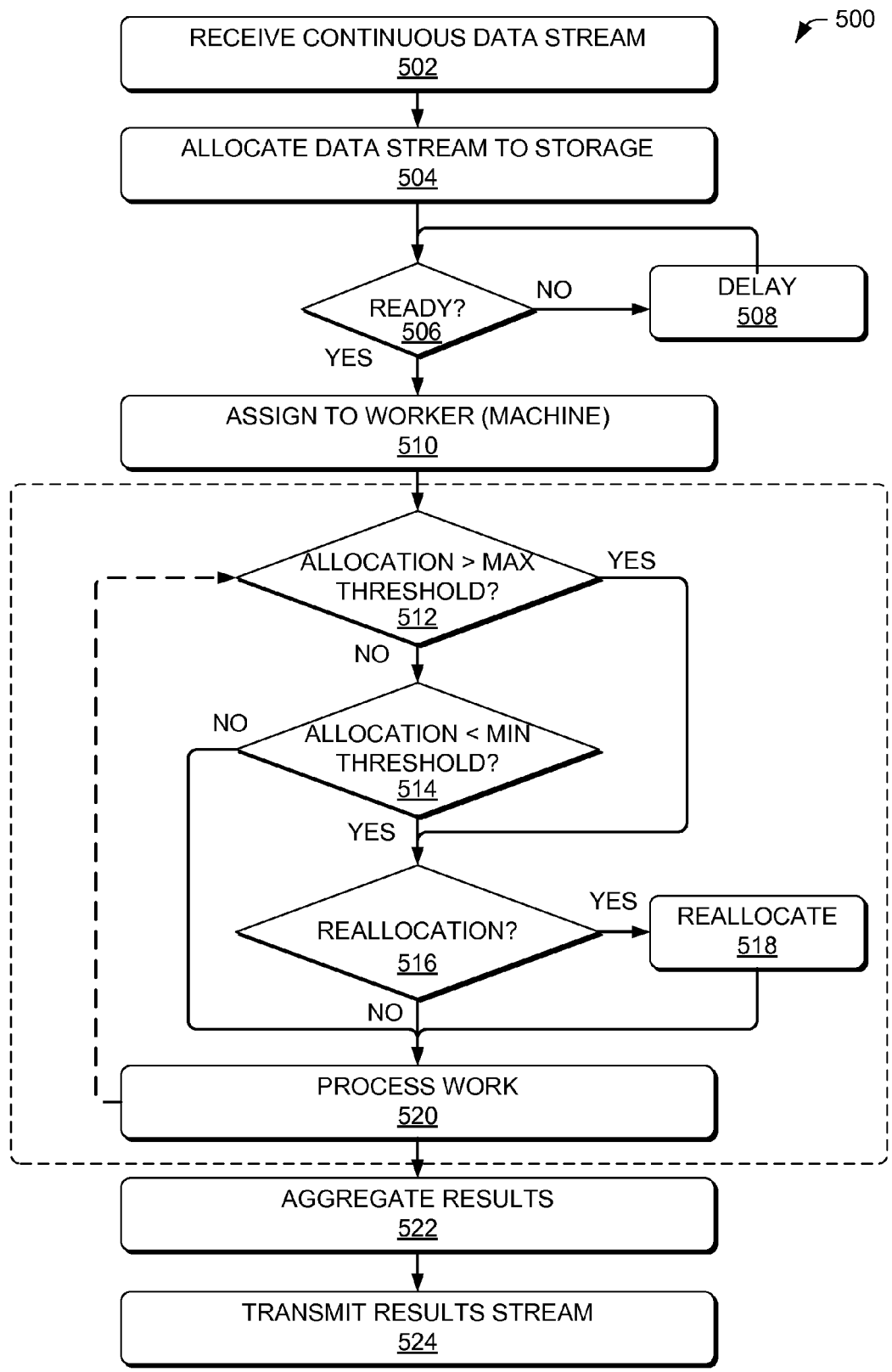
FIG. 5 is a flow diagram of an illustrative process to perform load balancing to process continuous steams of data.

FIG. 5 is a flow diagram of an illustrative process 500 to perform load balancing to process continuous or substantially continuous steams of data. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, including the process 300, in addition to process 500, shall be interpreted accordingly.

At 502, the dispatcher 110 may receive a continuous data stream (sync streams 106) from the mobile devices 102. The data stream may include information generated by users, sensors, or a combination of both, and transmitted via the mobile devices 102 to the dispatch 110 via the network 104.

At 504, the dispatcher 110 may allocate the data stream to the distributed storage 114 for at least temporary storage of the data stream.

At 506, the job manager 112 may determine whether one of the workers 116 is ready to process work from the distributed storage 114. When the workers 116 are unable to process the work, and are thus not ready (the "no" branch in decision 506), the job manager 112 may delay at 508 and cause some latency in the processing of data. After the delay, the process 500 may return to the decision at 506. When the workers 116 are ready and available to process the data stream stored in the distributed storage 114 (the "yes" branch in decision 506), the job manager 112 may assign work the workers 116 at 510 to process the data stream.

At 512, the job manager 112 may determine whether an allocation of work (i.e., processing the data stream) for a worker reaches or exceeds a maximum threshold. For example, when the utilization of a single worker exceeds the maximum threshold, some of the work may be reallocated to another worker. When the maximum threshold is not reached (or exceeded in some instances), following the "no" branch of decision 512, the job manager 112 may determine whether the allocation of work (i.e., processing the data stream) for a worker reaches or falls below a minimum threshold at 514. Following the "yes" branch from either decision 512 or decision 514 (i.e., threshold reached or passed), the job manager 112 may reallocate work between two or more of the workers 116. For example, when a worker falls below a minimum amount of work ("yes" branch of decision 514), then the worker may be assigned additional work to process at 518 (via "yes" branch of decision 516). When the allocation exceeds the maximum threshold ("yes" branch of decision 512), additional workers may be deployed to process the work when load balancing is not feasible, efficient, or cost effective. In some embodiments, the reallocation decision at 516 may determine not to reallocate work at 518, such as when the workload is expected to drop after a short period of time or for other reasons.

At 520, the workers 116 may process the work (i.e., the data stream). The operations 512 to 520 may be performed by a loop process (via dashed line from the operation 520 that leads back to the decision 512) that may include continuous load balancing, reallocations, and/or deployment or termination of workers, as needed.

At 522, the aggregators 118 may aggregate the processed work from the workers 116. At 524, the aggregators 118 (or the job manager 112) may transmit the results stream 122 to at least a portion of the mobile devices 102.

Illustrative Algorithms

FIG. 6 is an illustrative algorithm 600, which performs some basic stream operations. The data stream is a continuously expanding data sequence with elements ordered according to their timestamps. The algorithm 600 is used to present various illustrative implementations of features that were discussed previously. The following discussion refers to the illustrative algorithm 600 by a line number 602 shown in the left hand side of the algorithm. The discussion provides various features that may be implemented in any order, function, or variation of modules to perform the various features described more generally above. Therefore, the techniques discussed above are not limited by the implementation of the illustrative algorithm 600.

In accordance with various embodiments, line 1 may define a stream of data type "Location". A callback function TripSegmentation is subscribed to this stream (line 2) and is triggered when a new stream element is appended. A stream can be explicitly appended to (line 3), in this case by reading from the GPS sensor.

A callback can subscribe to more than one stream. With Zip(X; Y; c), the callback c is triggered when both X and Y have a new element (matched as a pair); while with Combine the callback executes when either stream has a new element.

A mobile sensing application is usually driven by sensor inputs, expressed as active streams. An active stream may be associated with a data source and may have an update interval, as shown in lines 5-7.

Built-in relational operator support may include filtering, projection, union, grouping, join, and aggregations. A relational operator treats a stream as a relational table containing all elements appended to the stream. Lines 11-13 define stream Y by filtering elements in X and then applying the MatchLocationOnMap function to each remaining element.

The system may control when subscribers are triggered and which subset of elements an operator may observe. Time or count based windowing is a common way to express such features. Lines 15-16 define stream Y as a stream of averages of every x seconds (e.g., 5 seconds, etc.) window of values in stream X.

Sometimes the latest value in a time series matters. Stateful streams may be used to define a changing state. Lines 18-20 define a stateful stream to track the maximum (temperature) value observed in stream X.

In some instances, developers may annotate streams to direct execution and optimization. For example, stream X on lines 22-23 is annotated as Partitionable with a key selector USER ID. This may allow parallel in-cloud execution of the callback Func.

In addition to the relational and windowing operators that are available in traditional stream databases, sync streams may be used for communication between the mobile devices 102 and the cloud 108 to relieve programmers from writing networking code. A sync stream may be maintained in the cloud and on a mobile device, and is a reliable unidirectional channel between a source stream and the sink stream. A synchronization policy directs how and when items are propagated from the source to the sink. For two-way communication programmers can use two sync streams.

Lines 25-28 illustrate basic usage of a source stream X and a corresponding sink stream Y. Updates to X are propagated to Y and trigger subscribed callbacks on the sink stream Y. Synchronization policies afford great flexibility, which are illustrated with several built-in mobile communication optimizations.

During disconnections, the source streams buffer data and resume normal operation upon reconnection. Connectivity interruptions may be handled transparently if desirable. An application may also decide to be notified when disconnections occur.

FIG. 7 is an illustrative algorithm 700 to perform adaptive sampling rate control for the mobile devices 102. The code in algorithm 700 is described by a line number 702 shown on the left hand side of the algorithm. The algorithm may include lines 2 and 13, which create a GPS stream of GPS readings and a signals stream to control the sampling frequency of the GPS stream, respectively. As shown in lines 4-10, code may be added to lower a sampling rate by a factor of N when the battery is low. Line 12 may further remove GPS readings when the mobile device is detected to be indoors. Thus, the code may enable more efficient use of the mobile devices 102 and reduce unnecessary data processing in the cloud 108.

Illustrative Computing Device

Figure 8:
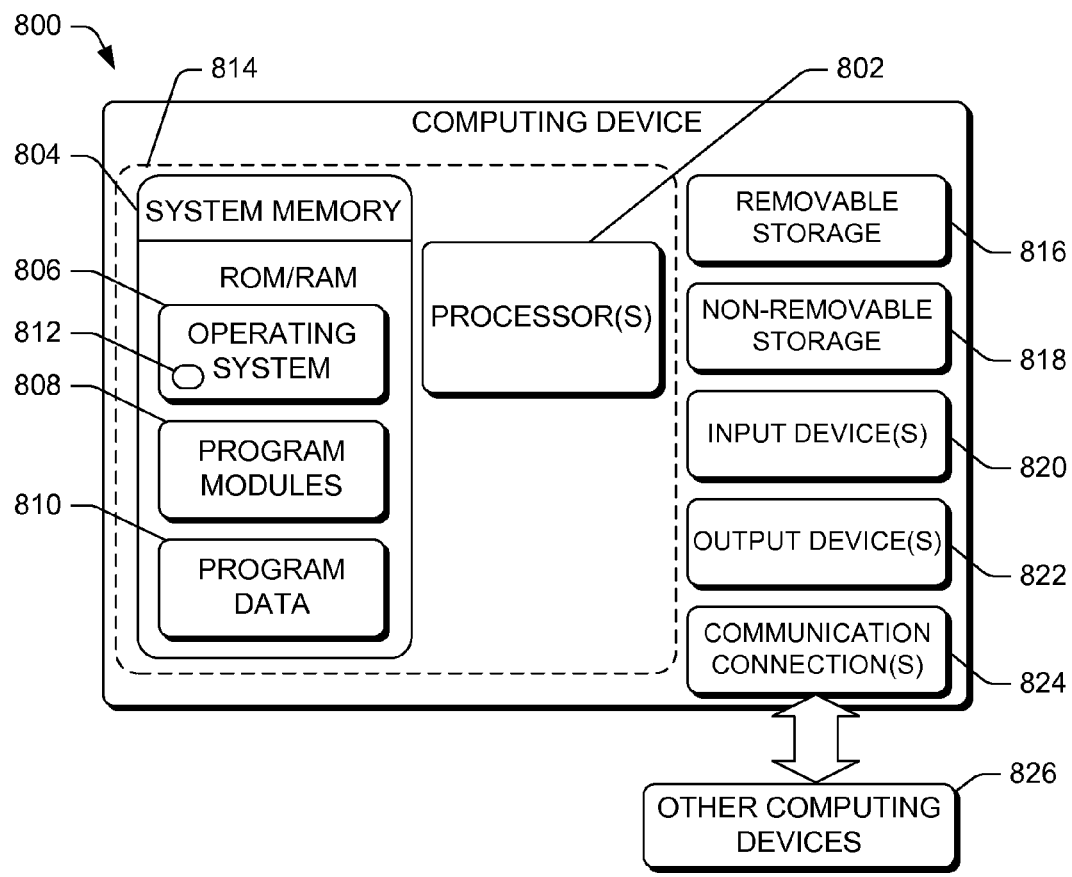
FIG. 8 is a block diagram of an illustrative computing device that may be deployed in the environment shown in FIG. 1.

FIG. 8 shows an illustrative computing device 800 that may be used to implement the platform for continuous mobile-cloud services. It will readily be appreciated that the various embodiments described above may be implemented in other computing devices, systems, and environments. The computing device 800 shown in FIG. 8 is only one example of a computing device and is not intended to suggest any limitation as to the scope of use or functionality of the computer and network architectures. The computing device 800 is not intended to be interpreted as having any dependency or requirement relating to any one or combination of components illustrated in the example computing device.

In a very basic configuration, the computing device 800 typically includes at least one processing unit 802 and system memory 804. Depending on the exact configuration and type of computing device, the system memory 804 may be volatile (such as RAM), non-volatile (such as ROM, flash memory, etc.) or some combination of the two. The system memory 804 typically includes an operating system 806, one or more program modules 808, and may include program data 810. The computing device 800 is of a very basic configuration demarcated by a dashed line 814. Again, a terminal may have fewer components but will interact with a computing device that may have such a basic configuration.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 816 and non-removable storage 818. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 804, the removable storage 816 and the non-removable storage 818 are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 800. Any such computer storage media may be part of the computing device 800. Moreover, the computer-readable media may include computer-executable instructions that, when executed by the processor(s) 802, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 800 may also have input device(s) 820 such as keyboard, mouse, pen, voice input device, touch input device, etc. Output device(s) 822 such as a display, speakers, printer, etc. may also be included. These devices are well known in the art and are not discussed at length here.

The computing device 800 may also contain communication connections 824 that allow the device to communicate with other computing devices 826, such as over a network. These networks may include wired networks as well as wireless networks. The communication connections 824 are one example of communication media.

It is appreciated that the illustrated computing device 800 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 800 may be implemented in a cloud computing environment, such that resources and/or services are made available via a computer network for selective use by the mobile devices 102.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of managing workload of a data stream, the method comprising:
   receiving the data stream from a plurality of mobile devices;
   translating a logical plan for processing the data stream into a physical plan that enables deployment of a plurality of workers in a cloud-computing system to process the data stream;

assigning the data stream to the plurality of workers for processing based at least in part on the physical plan;

reallocating work between the plurality of workers to maintain a utilization of each worker between a minimum threshold and a maximum threshold; and performing a garbage collection process after incoming data logs for the data stream are determined to be stable in response to a computation performed by the plurality of workers.

2. The method as recited in claim 1, further comprising deploying additional workers to process the data stream when the utilization of the plurality of workers exceeds the maximum threshold.

3. The method as recited in claim 1, further comprising creating multiple intermediate checkpoints during the processing of the data stream to enable failure recovery by rolling back to a last checkpoint during a recovery process after occurrence of a failure by at least one of the plurality of workers.

4. The method as recited in claim 3, further comprising, in response to the failure, rolling back to a latest checkpoint and then re-executing processing by the plurality of the workers by reading locally stored input data.

5. The method as recited in claim 4, further comprising using a combination of partial rollback recover and map/reduce style re-computation from previous states based at least in part on the checkpoints to balance between run-time overhead and recovery cost during the processing of the data stream.

6. The method as recited in claim 1, further comprising storing the data stream in distributed storage before the assigning, and wherein the assigning is at least temporarily delayed after a receipt of a surge of the data stream that, when distributed to the plurality of workers, would result in a utilization of the plurality of workers that surpasses a maximum threshold.

7. An apparatus comprising:
a processor;
a memory communicatively coupled to the processor;
a module maintained in the memory and executed on the processor to:
receive a data stream from a plurality of mobile devices;
allocate the data stream to distributed storage devices for at least temporary storage;
assign processing of the data stream from the distributed storage to workers in a cloud-computing system; and
reallocate work between the workers in response to utilization of a worker reaching or exceeding a maximum threshold, wherein the data stream is stored in the distributed storage for additional time after receipt of a surge of the data stream to avoid the utilization of the worker reaching or exceeding the maximum threshold.

8. The apparatus as recited in claim 7, wherein the module aggregates results over the processed data; and
the module transmits the aggregated results to at least a portion of the plurality of mobile devices.

9. The apparatus as recited in claim 7, wherein the module further deploys or removes one or more workers based at least in part on the utilization of the worker.

10. The apparatus as recited in claim 7, wherein the data stream is a substantially continuous data stream.

11. The apparatus as recited in claim 7, wherein the module further performs checkpointing to enable rollback after a failure.

12. The apparatus as recited in claim 11, wherein the module further performs:
rolling back to a latest checkpoint after detecting the failure; and
re-executing processing by the workers of the data stream based at least in part on the latest checkpoint.

13. The apparatus as recited in claim 7, wherein the assigning processing of the data stream includes determining a window of time or amount of data for a continuous incremental computation to be processed by the workers.

14. The apparatus as recited in claim 7, wherein the module translates a logical plan to process the data stream into a physical plan that enables deployment of the workers to process the data stream.

15. The apparatus as recited in claim 7, wherein the module provides a same set of stream-based interfaces to enable developers to implement stream operation and the mobile-cloud communication.

16. One or more computer storage media storing computer-executable instructions that, when executed on one or more processors, causes the one or more processors to perform acts comprising:
dispatching a data stream to a distributed storage;
assigning the data stream stored in the distributed storage to workers in a cloud-computing system for processing of the data stream, wherein the assigning is at least temporarily delayed after receipt of a surge of the data stream which, when distributed to the workers, would result in a utilization of the workers that reaches or exceeds a maximum threshold; and
creating intermediate checkpoints during processing of the data stream to enable fault recovery after a fault by rolling back to a latest checkpoint and re-executing the processing of the data stream.

17. The one or more computer storage media as recited in claim 16, wherein the acts further comprise reallocating work between the plurality of workers to maintain a utilization of each worker between a minimum threshold and a maximum threshold.

18. The one or more computer storage media as recited in claim 16, wherein the acts further comprise deploying additional workers to process the data stream in response to utilization of the plurality of workers reaching or exceeding a maximum threshold.

19. The one or more computer storage media as recited in claim 16, further comprising using a combination of partial rollback recover and map/reduce style re-computation from previous states based at least in part on the intermediate checkpoints.

20. The one or more computer storage media as recited in claim 16, wherein the acts further comprise performing a garbage collection process after incoming data logs for the data stream are determined to be stable after a computation performed by the plurality of workers.

* * * * *